United States Patent
Pano et al.

(10) Patent No.: US 8,418,838 B2
(45) Date of Patent: *Apr. 16, 2013

(54) INSTANT POWDER CONVEYOR DEVICE OF A DRINKS PREPARING MACHINE

(75) Inventors: Giovanni Pano, Steinach (CH); Jörg Henke, Kreuzlingen (CH)

(73) Assignee: Eugster/Frismag AG, Amriswil (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/925,389

(22) Filed: Oct. 20, 2010

(65) Prior Publication Data

US 2011/0089000 A1    Apr. 21, 2011

(30) Foreign Application Priority Data

Oct. 21, 2009   (DE) .................. 20 2009 014 256 U

(51) Int. Cl.
*B65G 33/08*   (2006.01)

(52) U.S. Cl.
USPC ................. 198/671; 198/670; 198/668

(58) Field of Classification Search .......... None
See application file for complete search history.

(56) References Cited

U.S. PATENT DOCUMENTS

| 1,548,558 | A   |   | 8/1925  | Shutterly |
| 3,978,978 | A   | * | 9/1976  | Herter ........................ 198/601 |
| 4,487,337 | A   |   | 12/1984 | DeJardins |
| 4,964,545 | A   | * | 10/1990 | Mooshammer ............. 222/271 |
| 5,217,108 | A   | * | 6/1993  | Newnan ...................... 198/670 |
| 6,585,109 | B1  | * | 7/2003  | Beyer ........................... 198/812 |
| 6,843,361 | B2  | * | 1/2005  | Maingonnat et al. ........ 198/456 |

FOREIGN PATENT DOCUMENTS

| CA | 2211352        | 1/1998  |
| DE | 20 04 391      | 9/1970  |
| DE | 28 56 308      | 7/1980  |
| DE | 10 2004 059 646 A | 6/2006 |
| EP | 0 728 664      | 8/1996  |
| EP | 1 916 207      | 4/2008  |
| GB | 1171088        | 11/1969 |
| WO | WO 93/12704    | 7/1993  |
| WO | WO 2006/079580 | 8/2006  |

* cited by examiner

*Primary Examiner* — Kavel Singh
(74) *Attorney, Agent, or Firm* — DLA Piper LLP (US)

(57) ABSTRACT

An instant powder conveyor device of a drinks preparing machine including a wire conveyor spindle rotatably disposed in a bottom area of the instant powder container. At the end of the wire conveyor spindle an outflow opening is arranged. A unit for loosening up the instant powder in the instant powder container includes at least one striking element which is disposed, elastically adjustable, in axial direction of the wire conveyor spindle and extends substantially transverse into it.

3 Claims, 1 Drawing Sheet

Section A-A

Section B-B

Section C-C

INSTANT POWDER CONVEYOR DEVICE OF A DRINKS PREPARING MACHINE

BACKGROUND OF THE INVENTION

1. Field of the Invention

The present invention relates to an instant powder conveyor device of a drinks preparing machine.

2. Description of the Related Art

In prior art drinks preparing machines, an instant powder container each is provided wherein instant powder is stocked which is supplied by means of a conveyor device to a brewing or mixing or preparation arrangement. The conveyor device comprises, in particular, a conveyor screw or wire conveyor spindle disposed within a lower area of the instant powder container and suited to exactly dose smaller amounts of instant powder. Since the fluidability of the instant powder in the instant powder container may be impaired, particularly by vapor or air humidity, which leads to a so-called bridge formation of the instant powder so that the instant powder is not easily fluidic any more, the conveying function of the wire conveyor, or of the conveyor screw, may be reduced or interrupted as well. In particular, the wire conveyor spindle, or the conveyor screw, may carve out a tunnel corresponding to its diameter in the powder stock, whereupon no further conveying will be possible. This is particularly true in the case of vapor-generating drinks preparing machines where the vapor may enter through an outflow opening for the instant powder into the instant powder container at one end of the wire conveyor spindle, or conveyor screw. In order not to impair the conveyor action of the wire conveyor spindle, or the conveyor screw, means have already been known to loosen up the instant powder in the instant powder container.

In the food industry, for instance, where fine powder is conveyed, or dosed, from a mostly conical or trapezoidal container by means of a screw conveyor horizontally disposed in the lower area thereof, agitators and/or vibrators or paddles, strikers, air cushions, slip coatings are provided completely above the screw conveyor in order to get the powder to an inflow of the screw conveyor (EP-A 1 916 207). These measures, however, require substantial technical elaboration particularly with a view to the drives of the agitators, vibrators, paddles, strikers, and/or they are not sufficiently effective so that they can hardly be taken into consideration for household preparing devices or semi-professional applications.

BRIEF SUMMARY OF THE INVENTION

It is therefore an object of the invention to provide an instant powder conveyor device of a drinks preparing machine of the kind referred to in the beginning with means for loosening up the instant powder in the instant powder container, particularly in the effective range of the wire conveyor spindle, or conveyor screw, which are reliably effective for loosening up an instant powder impaired in its fluidability by humidity, requiring however only a few uncomplicated parts and, in particular, no separate drive units.

This task is solved by an instant powder conveyor device of a drinks preparing machine according to the present invention, comprising a wire conveyor spindle, or conveyor screw, pivotally arranged in a bottom area of the instant powder container, at the end of which wire conveyor spindle, or conveyor screw, an outflow opening being disposed, and a means for loosening up the instant powder in the instant powder container; and in the present invention, in the instant powder container at least one striking element is elastically adjustable in an axial direction of the wire conveyor spindle, or conveyor screw, and is disposed extending substantially transverse into the wire conveyor spindle, or conveyor screw.

The striking element provided according to the invention in the instant powder container, is elastically adjustable in axial direction of the wire conveyor spindle, or conveyor screw, and engages into the wire conveyor spindle, or conveyor screw, substantially transverse thereto. In this arrangement, the striking element does not require any separate drive unit. It is driven by the wire conveyor spindle, or the conveyor screw, namely via an adjusting path at the end of which the striking element bounces out from the wire conveyor spindle, or conveyor screw, and bounces back in view of the elastic adjustability, moving in this way or dissolving by striking the instant powder so that the instant powder arrives in the substantially horizontally disposed wire conveyor spindle, or conveyor screw, and is horizontally conveyed by it. In view of the elastic resetting, the striking element, unless it strikes against hardened instant powder, may pound against a flank of the wire conveyor spindle, or conveyor screw, which follows the flank from which the striking element had slipped out. By the bouncing back of the striking element, the powder, particularly between the two flanks referred to, but also outside of this area of the wire conveyor spindle, or conveyor screw, is moved by the striking element. By the impact on the wire conveyor spindle, or conveyor screw, the impact may be transferred via the wire conveyor spindle, or conveyor screw, to the instant powder surrounding it and avoid bridge creation of the instant powder.

For instance, the striking element and the wire conveyor spindle, or conveyor screw, are so disposed, or dimensioned, that after each rotation each of the wire conveyor spindle, or conveyor screw, the striking element slips out of the latter bouncing to the following flank. Depending on the arrangement and dimensioning of the above-reference parts, this bounce may, however, also occur after one partial rotation only which might make relatively little, more even, wear possible.

The effect of the elastically adjustable striking element is the larger, the larger the pitch, or the thread, respectively, of the wire conveyor spindle, or conveyor screw.

According to the present invention, the striking element is disposed outside the wire conveyor spindle, or conveyor screw, preferably above the wire conveyor spindle, or conveyor screw, on a suspension wherein a return spring is connected with the suspension, on one hand, and with the striking element, on the other. In this context, the suspension may be provided either on a particular suspension device or on an instant powder container lid. In both cases, the arrangement is uncomplicated and guarantees a reliable function of the striking element.

Furthermore, in the present invention, the striking element is particularly simply connected with the suspension via a plate spring as the return spring. In this way, the plate spring serves for the provision of the striking element on the suspension and for the elastic adjustability of the striking element.

The striking element of the present invention includes an impacting face substantially disposed transverse to the axial direction of the wire conveyor spindle, or conveyor screw. The impacting face enlarges the area of influence of the striking element on the instant powder. For wear reduction, the impacting face of the striking element may, furthermore, be inclined about the pitch angle of the wire conveyor spindle, or conveyor screw, relative to the normal cross sectional area thereof which is considered at right angles relative to the axis of the wire conveyor spindle, or conveyor screw.

Furthermore, in the present invention, the impacting face of the striking element is furthermore preferably adapted to the cross section of the bottom area of the instant powder container but movable, non-impeded by the bottom area, to have a large-area effect on the instant powder.

In order to be effective over a larger axial extension of the wire conveyor spindle, or conveyor screw, to loosen up the instant powder, a plurality of striking elements is arranged in a staggered way along the axial direction on the wire conveyor spindle, or conveyor screw.

DETAILED DESCRIPTION OF THE INVENTION

In the following, a preferred embodiment of the present invention will be described in regards to the accompanying drawing including four figures, wherein a wire conveyor spindle is shown in a simplified form. From that description further advantageous details may be taken.

Figure 1:
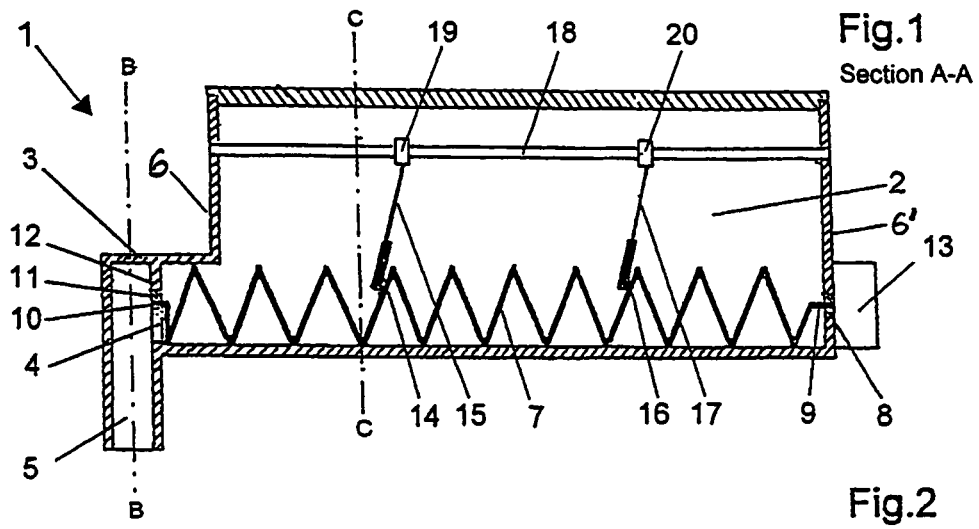
FIG. 1 shows an instant powder conveyor device of a drinks preparing machine according to the present invention in a longitudinal cross section including two striking elements in a first position of the striking elements.
Figure 2:
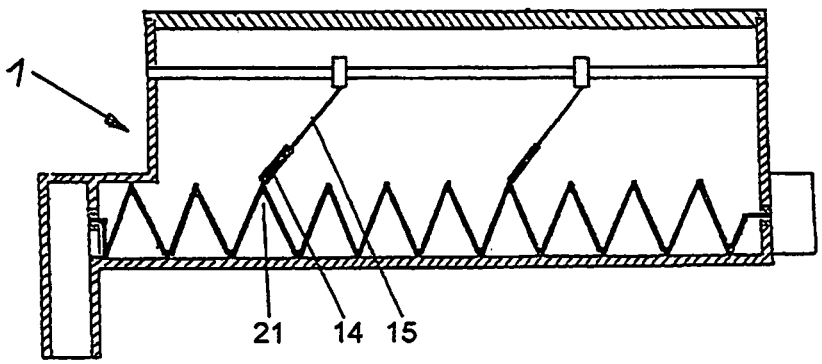
FIG. 2 shows the instant power conveyor device according to FIG. 1 in a second position of the striking elements.

In FIGS. 1 and 2, an instant powder conveyor device is generally referred to by 1 which includes an instant powder container 2 for stocking instant powder. On the, non-designated, groove-shaped bottom area of the instant powder container, the former leads into an outflow cylinder 3, specifically at one front wall 6 of the instant powder container 2 which faces a back wall 6'. Via an outflow opening 4, the outflow cylinder is connected with a perpendicularly disposed discharge chute 5 which leads to a brewing or mixing or preparing arrangement, not shown.

Into the outflow cylinder 3, there extends an end of a wire conveyor spindle 7 which is horizontally disposed in the bottom area of the instant powder container and supported at one end by means of a conveyor spindle drive journal 9 in a conveyor spindle shaft bearing 9 in the back wall 6'. The conveyor spindly drive journal 9 is pivotally connected with an electro motor 13 disposed outside on the back wall 6'.

Figure 3:
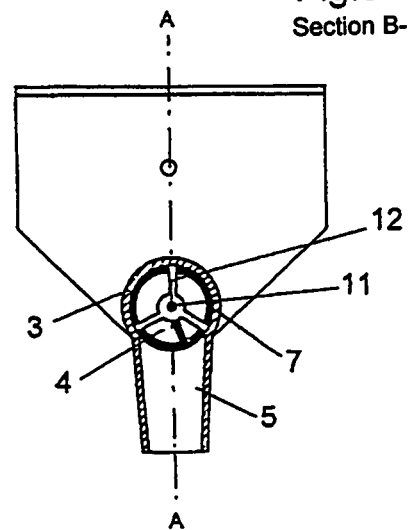
FIG. 3 shows a cross section through the instant powder device according to FIG. 1 in the sectional plane B-B.

At its outflow cylinder side end, the wire conveyor spindle is pivotally supported by means of a front-side conveyor spindle bearing journal 10 in a front-side conveyor spindle journal bearing 11. A conveyor spindle journal bearing connection shown in detail in FIG. 3 is referred to as 12.

Figure 4:
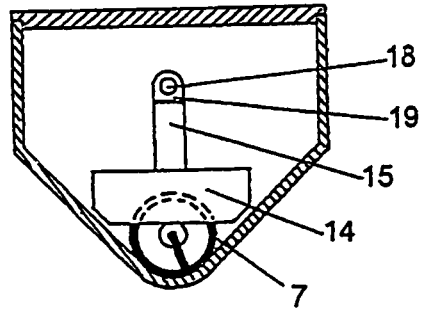
FIG. 4 shows a cross section through the instant powder conveyor device according to FIG. 1 in the sectional plane C-C.

As can be taken from FIGS. 1 and 2, two striking elements 15 and 16 are provided engaging in the wire conveyor spindle 7 and staggered in axial direction of the wire conveyor spindle 7, and are substantially arranged above it. The axial direction of the wire conveyor spindle 7 constitutes the direction of its fictive center axis or rotational axis. The striking elements 14 and 16 each, as can be taken from FIG. 4, are adapted to the bottom area of the instant powder container 2 and can move thereon, unhindered.

The two striking elements 14 and 16 are connected via a plate spring 15 or 17, respectively, each, with a suspension 18 above the wire conveyor spindle 7, specifically by means of a return spring connection 19, or 20, respectively. The suspension 18 is supported at the front wall 6 and on the back wall 6'; in a different embodiment, however, it might be secured to the lid above the suspension 18 as well.

The transportation direction of the wire conveyor spindle 7 proceeds in the present exemplified embodiment in the FIGS. 1 and 2 of the drawing from right to left to the outflow opening 4.

In the situation as shown in FIG. 1, the two striking elements 14 and 16 are in a starting position in which they rest on one flank each of the wire conveyor spindle 7. When rotating the wire conveyor spindle 7 by means of the electro motor 13, they glide along the coil of the wire conveyor spindle 7 until they arrive at a reset position, shown in FIG. 2. The reset position 21 refers to the striking element 14. When the wire conveyor spindle 7 continues to rotate, the striking elements glide under the effect of the return springs 15, 17 beyond the flank of the wire conveyor spindle, at which they had rested in their reset position, and while loosening up the instant powder bounce back into the starting position shown in FIG. 1, where each of them rests again at one flank of the wire conveyor spindle 7 to be taken along in conveying direction again. If the striking elements 14, 16 meet with resistance when bouncing back, be it clotted instant powder or the following flank of the wire conveyor spindle, they act effectively, by their impact, onto the resistance. In this way, the instant powder is effectively loosened up either directly or indirectly via the wire conveyor spindle 7 and is conveyed without trouble by means of the wire conveyor spindle 7 to the outflow opening 4.

The invention claimed is:
1. An instant powder conveyor device of a drinks preparing machine consisting of a wire conveyor spindle pivotally arranged in a bottom area of an instant powder container, at an end of which wire conveyor spindle an outflow opening is disposed, and a means for loosening up instant powder in said instant powder container, wherein
    in said instant powder container at least one striking element which is independent from and engageable with said wire conveyor spindle is suited to be dragged along elastically in an axial direction of the wire conveyor spindle and is disposed extending substantially transversely into the wire conveyor spindle in its normal cross sectional plane,
    the at least one striking element is connected outside of the wire conveyor spindle via a return spring with a suspension,
    the return spring is suited to return the at least one striking element elastically in the axial direction of the wire conveyor spindle,
    the at least one striking element is connected via a plate spring as the return spring with the suspension,
    the at least one striking element has an impacting face disposed substantially transverse relative to the axial direction of the wire conveyor spindle, and
    the impacting face is disposed inclined about a pitch angle of the wire conveyor spindle against its normal cross sectional plane.
2. The instant powder conveyor device according to claim 1, wherein said impacting face is adapted to a shape of the bottom area of said instant powder container.
3. The instant powder conveyor device according to claim 1, wherein a plurality of striking elements are disposed in staggered arrangement relative to the axial direction of said wire conveyor spindle.

* * * * *